United States Patent

Smith

[11] Patent Number: 5,209,501
[45] Date of Patent: May 11, 1993

[54] NEEDLE PACKING ASSEMBLY

[75] Inventor: Rowland C. Smith, Wimborne, United Kingdom

[73] Assignee: ITW Limited, Berkshire, United Kingdom

[21] Appl. No.: 705,116

[22] PCT Filed: Feb 5, 1991

[86] PCT No.: PCT/GB91/00166

§ 371 Date: Jun. 24, 1991

§ 102(e) Date: Jun. 24, 1991

[87] PCT Pub. No.: WO91/11644

PCT Pub. Date: Aug. 8, 1991

[30] Foreign Application Priority Data

Feb. 5, 1990 [GB] United Kingdom ............ 9002525

[51] Int. Cl.$^5$ .................................... F16J 15/18
[52] U.S. Cl. ................ 277/102; 277/112; 277/115; 277/117; 277/124; 277/116.6; 277/125
[58] Field of Search ............ 277/112, 102, 110, 115, 277/117, 123, 124, 125, 152, 116.4, 116.6, 116.8, 212 R, 212 F, 212 C, 190, 24; 239/526; 251/214, 903

[56] References Cited

U.S. PATENT DOCUMENTS

| 52,742 | 2/1866 | Prindle | 277/212 |
|---|---|---|---|
| 801,960 | 10/1905 | Badeker | 277/118 |
| 1,359,428 | 11/1920 | Ransdell | 277/118 |
| 1,444,457 | 2/1923 | Gates | 277/118 |
| 2,307,152 | 1/1943 | Murray | 277/24 |
| 2,564,912 | 8/1951 | McKissick | 277/115 |
| 3,059,937 | 10/1962 | Wettstein | 277/110 |
| 3,096,096 | 7/1963 | Banks | 277/121 X |
| 3,218,087 | 11/1965 | Hallesy | 277/112 |
| 3,279,742 | 10/1966 | Billeter | 251/214 |
| 3,351,351 | 11/1967 | Bentley-Leek | 277/212 F |
| 3,836,082 | 9/1974 | Krohn | 239/526 |
| 4,079,950 | 3/1978 | Langford | 277/152 |
| 4,131,286 | 12/1978 | Bainard | 277/152 |
| 4,166,579 | 9/1979 | Beise et al. | 239/526 |
| 4,353,560 | 10/1982 | Tohill | 277/117 X |
| 4,558,874 | 3/1985 | Williams et al. | 277/112 |
| 4,560,109 | 12/1985 | Teruyuki et al. | 239/583 |
| 5,050,804 | 9/1991 | Svendsen et al. | 277/212 R X |
| 5,083,749 | 1/1992 | Linderman et al. | 277/190 X |

FOREIGN PATENT DOCUMENTS

| 0715496 | 11/1941 | Fed. Rep. of Germany | 277/212 F |
|---|---|---|---|
| 0834305 | 3/1952 | Fed. Rep. of Germany | 277/24 |
| 0573510 | 3/1924 | France | 277/212 F |
| 684147 | 6/1930 | France | 277/115 |
| 2343953 | 1/1977 | France | |
| 0123332 | 2/1919 | United Kingdom | 277/212 |
| 799991 | 9/1958 | United Kingdom | |
| 2118280 | 3/1983 | United Kingdom | |

*Primary Examiner*—Allan N. Shoap
*Assistant Examiner*—James K. Folker
*Attorney, Agent, or Firm*—MacMillan, Sobanski & Todd

[57] ABSTRACT

A needle packing assembly is described comprising an annular seal (1) of ultra-high molecular weight plastics material such as polyethylene. A stepped concentric passage (4) passes through the seal with a shoulder (6). The outer end of the inner wall of the passage has a sealing lip (7) formed by a 15° angle with the inner wall. The lip engages a needle (8) of a valve preventing the ingress of fluid past the seal. The assembly also includes a liner (9) made of a lower molecular weight yieldable plastics material such as P.T.F.E. to provide a slidable seal with the needle (8). The liner is forced against the shoulder (6) via a packing piece (10) and disc springs (12) by a nut (14) screw-threaded onto a sleeve in a spraygun. Adjustment of the nut (14) forces the liner to expand forming a self-lubricating bearing with the needle (8) and forces the sealing lip into engagement with the needle to prevent the passage of fluid past the seal.

12 Claims, 3 Drawing Sheets

NEEDLE PACKING ASSEMBLY

TECHNICAL FIELD

This invention relates to a needle packing assembly more particularly for sealing the valve needle of a spraygun.

BACKGROUND ART

In existing sprayguns for spraying fluids using conventional atomising air the needle is sealed by woven asbestos filled with a P.T.F.E. (polytetrafluoroethylene) and a grease mixture. Sometimes graphite is used in the grease.

The needles of these existing needle valves are subjected to wear and to improve the seal an adjustment has to be made of a spring loaded collar. This has the disadvantage of having to remove the front of the spraygun to provide access to the needle packing assembly.

DISCLOSURE OF INVENTION

An aim of the invention is to overcome the above mentioned disadvantage and to provide an improved needle packing assembly which eliminates the use of asbestos for health reasons.

According to the present invention there is provided a needle packing assembly comprising an annular seal of ultra-high molecular weight plastics material and a liner of yieldable plastics material of a lower molecular weight, a sealing lip being formed at one end of the inner annular wall of the annular seal, the liner being forced against the annular seal to expand and form a self lubricating bearing for a needle passing through the assembly, the sealing lip engaging the needle to prevent the passage of a fluid past the seal.

Preferably, the annular seal has a shoulder in the interior of the seal against which the liner abuts.

Conveniently, the sealing lip forms an angle of 15° with the inner wall of the annular seal.

Embodiments of the needle packing assembly will now be described, by way of example only, with reference to the accompanying drawings, in which:

BEST MODE FOR CARRYING OUT THE INVENTION

Figure 3:
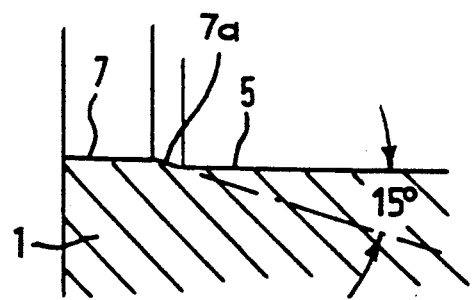
FIG. 3 is an enlarged detail of a sealing lip of the annular seal.

The needle packing assembly comprises an annular seal 1 of ultra-high molecular weight plastics material such as polyethylene. The seal 1 has a cone shaped wall 2 at one end and a bevel 3 at its other. A stepped concentric passage 4 passes through the seal with a reduced diameter 5 forming a stepped shoulder 6. The outer end of the inner wall of the passage has a sealing lip 7 which preferably includes at least a portion 7a which is conical and is formed at a 15° angle with the inner wall and the axis of the passage as shown in the enlarged detail of FIG. 3. This lip engages a needle 8 of a valve preventing ingress of the fluid being sprayed past the seal.

The needle packing assembly also comprises a sleeve shaped liner 9 made of a lower molecular weight yieldable plastics material, such as P.T.F.E. to provide a slidable seal with the needle 8. This liner abuts against the shoulder 6 and is forced against the shoulder by a stainless steel packing piece 10 formed with a collar 11 of reduced diameter around which are arranged a number of stainless steel disc springs 12, the other end of the packing piece having a bevelled end face 13. The springs 12 and packing piece 10 are forced against the liner 9 by a screw-threaded stainless steel packing nut 14 encircling the collar 11 and the needle 8, the end wall 15 of the nut applying an adjustable pressure on the springs when the nut is screwed onto a sleeve 16 of the spraygun 17.

Adjustment of the nut 14 expands the liner 9, sealing it against the needle 8 and forces the cone shaped wall 2 against a matching taper in the sprayhead sealing it against needle 8 preventing ingress of the fluid material being sprayed past the seal.

Figure 1:
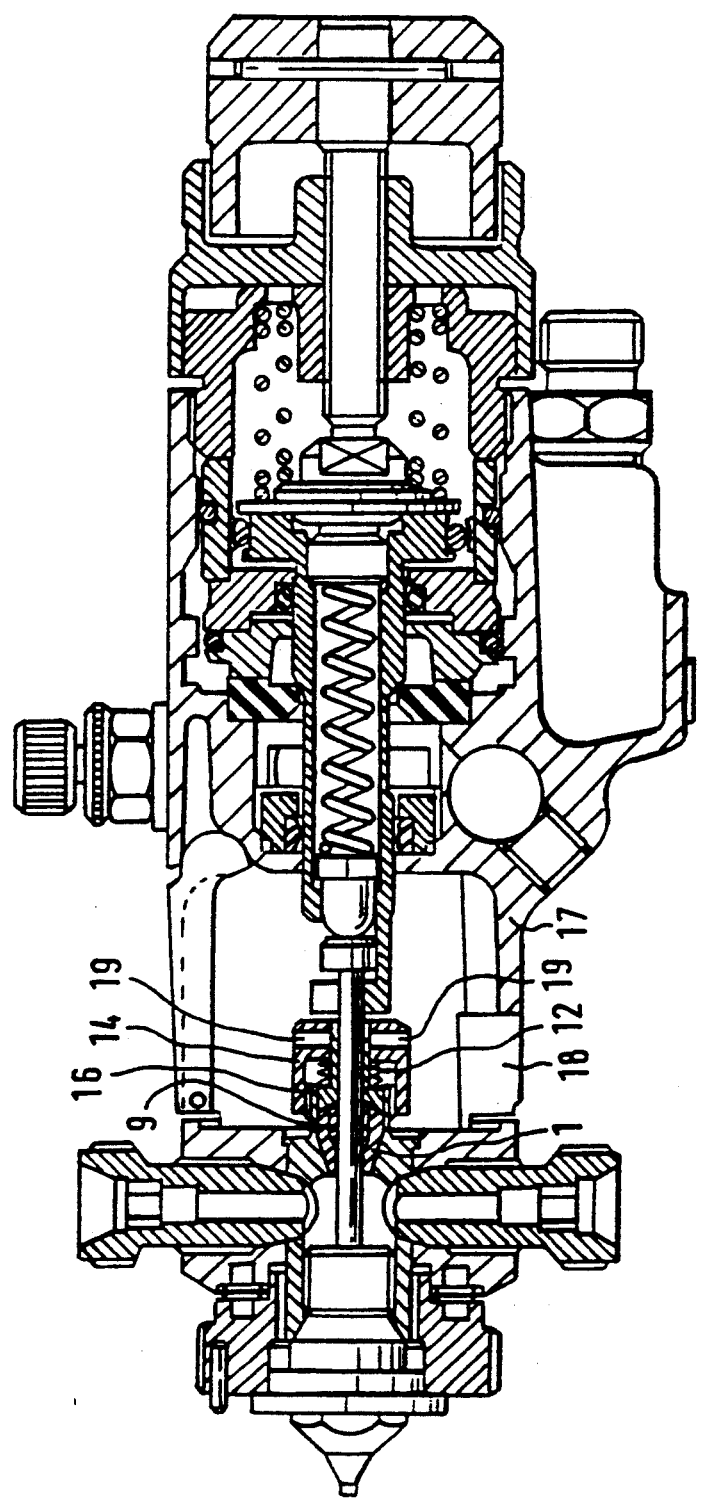
FIG. 1 is a longitudinal cross-section of an automatic spraygun fitted with a first embodiment of a needle packing assembly according to the invention.
Figure 2:
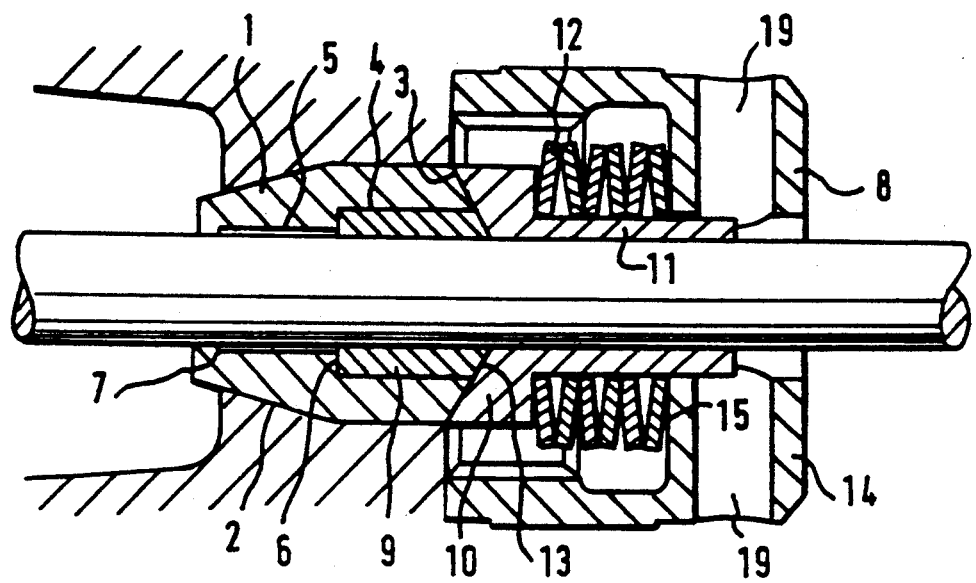
FIG. 2 is a cross-sectional detail of the needle packing assembly.

To facilitate adjustment of the needle packing assembly, the body of the spraygun 17 (see FIG. 1) has an opening 18 through which a tommy bar can be inserted to locate in holes 19 in the nut to tighten it. It will be appreciated that this adjustment can be readily carried out without having to remove the sprayhead from the spraygun.

Figure 4:
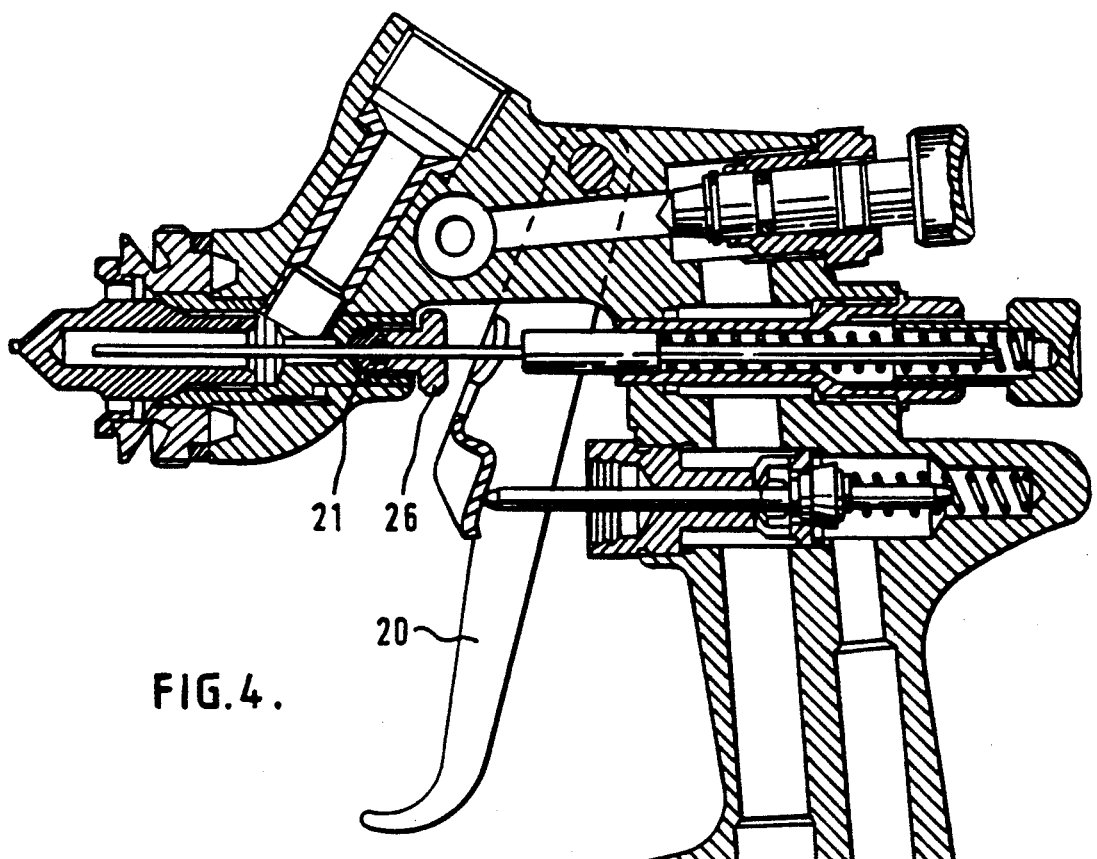
FIG. 4 is a cross-sectional elevation of a hand-held spraygun fitted with a second embodiment of the needle packing assembly according to the invention.
Figure 5:
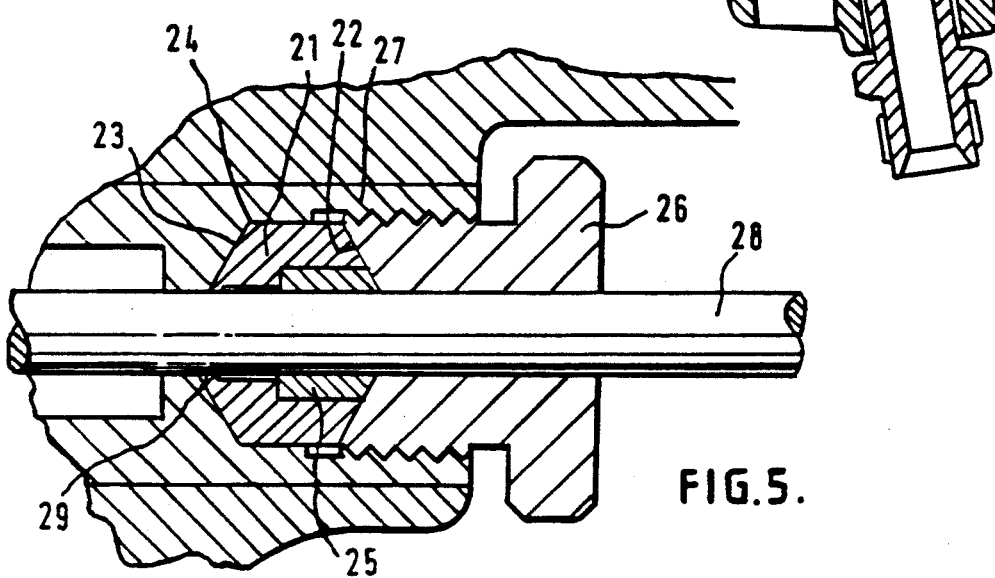
FIG. 5 is an enlarged detail of the needle packing assembly shown in FIG. 4.

In the second embodiment of the needle packing assembly shown in FIGS. 4 and 5, the assembly is mounted in front of the trigger 20 and comprises an annular seal 21 made of an ultra-high molecular plastics material such as polyethylene. The annular seal has cone shape ends 22 and 23 and is mounted in a body insert 24. Located in the annular seal 21 is a liner 25 of a yieldable plastics material such as P.T.F.E. which has self-lubricating properties. An adjustable nut 26 is screw-threaded into the body insert 24 and has a cone shaped forward end 27 which engages the cone shaped end 23 of the annular seal and liner to force them into the gun body. By adjustment of the nut the liner expands into engagement with a needle 28 lubricating it. This forward force applies pressure to the annular seal to force a lip 29 against the needle preventing the ingress of fluid back through the seal. Any wear of the needle or liner can be adjusted by adjustment of the nut 26.

Although the most suitable material for the annular sleeve is an ultra-high molecular weight polyethylene, other ultra-high molecular weight plastics material may be used. Similarly although the liner is described as being made of a lower molecular weight yieldable plastics material, such as P.T.F.E., any suitable yieldable plastics material can be used.

I claim:

1. An improved needle packing assembly for sealing a valve needle of a spray gun, said spray gun having a body, comprising an annular seal mounted in said spray gun body coaxial with said valve needle, said seal having an axial opening with an interior surface forming a sealing lip at one end of said opening, said sealing lip slidably engaging said valve needle to prevent passage of fluid past said seal, an annular liner coaxial with and abutting said seal and said valve needle, and means forcing said liner against said seal to expand said liner against said valve needle, said liner forming a self-lubricating bearing for said valve needle.

2. An improved needle packing assembly, as claimed in claim 1, wherein said seal opening has an enlarged diameter end opposite said one end, said enlarged diameter end receiving at least a portion of said liner, and wherein said liner abuts a shoulder in said seal opening.

3. An improved needle packing assembly, as claimed in claim 1, wherein said sealing lip is conical and forms an angle with the axis of said opening.

4. An improved needle packing assembly, as claimed in claim 3, wherein said conical sealing lip forms an angle of 15° to the axis of said opening.

5. An improved needle packing assembly, as claimed in claim 1, wherein said seal is formed from an ultra-high molecular weight plastics material, and wherein said liner is of a yieldable plastics material of a lower molecular weight than said seal.

6. An improved needle packing assembly, as claimed in claim 5, wherein said seal is of polyethylene.

7. An needle packing assembly, as claimed in claim 6, wherein said liner is formed of polytetrafluoroethylene.

8. An needle packing assembly, as claimed in claim 1, wherein said means for forcing said liner against said seal includes a packing piece and a spring mounted to apply a force to said packing piece to urge said packing piece against said liner.

9. An needle packing assembly, as claimed in claim 8, wherein said spring comprises a plurality of stainless steel disc springs.

10. An needle packing assembly, as claimed in claim 8, wherein said annular seal has a chamfered face formed on an end adjacent said packing piece and wherein said packing piece has a chamfered face engaging said chamfered seal face.

11. An needle packing assembly, as claimed in claim 10, wherein said liner has a chamfered face engaging said chamfered packing piece face.

12. An needle packing assembly, as claimed in claim 11, and further including a threaded packing nut means engaging said spray gun body, said packing nut means engaging said spring for applying an adjustable force through said packing piece to said seal and said liner.

* * * * *